United States Patent
Papathanasiou et al.

(10) Patent No.: US 7,499,687 B2
(45) Date of Patent: Mar. 3, 2009

(54) WIRELESS TRANSMITTER DC OFFSET RECALIBRATION

(75) Inventors: Konstantinos Papathanasiou, Athens (GR); Spyridon Vlassis, Athens (GR)

(73) Assignee: Theta Microelectronics, Inc., San Jose, CA (US)

( * ) Notice: Subject to any disclaimer, the term of this patent is extended or adjusted under 35 U.S.C. 154(b) by 502 days.

(21) Appl. No.: 11/269,987

(22) Filed: Nov. 9, 2005

(65) Prior Publication Data

US 2006/0099917 A1    May 11, 2006

Related U.S. Application Data

(60) Provisional application No. 60/625,978, filed on Nov. 9, 2004.

(51) Int. Cl.
  H04B 7/00 (2006.01)
  H04B 1/38 (2006.01)
  H04B 17/00 (2006.01)
(52) U.S. Cl. .................. 455/250.1; 455/570; 455/67.13; 455/136
(58) Field of Classification Search ................. 455/136, 455/250.1, 259, 260, 138, 245.1, 232.1, 240.1, 455/137, 67.13, 570; 327/307, 362; 330/2, 330/51; 375/319, 346
See application file for complete search history.

(56) References Cited

U.S. PATENT DOCUMENTS

| | | | |
|---|---|---|---|
| 5,140,699 A | 8/1992 | Kozak | |
| 5,789,974 A | 8/1998 | Ferguson, Jr. et al. | |
| 5,898,912 A * | 4/1999 | Heck et al. | 455/234.2 |
| 6,163,285 A * | 12/2000 | Lopata | 341/118 |
| 6,275,087 B1 * | 8/2001 | Dehghan | 327/306 |
| 6,356,217 B1 * | 3/2002 | Tilley et al. | 341/118 |
| 6,516,187 B1 | 2/2003 | Williams et al. | |
| 6,560,448 B1 | 5/2003 | Baldwin et al. | |
| 6,735,422 B1 | 5/2004 | Baldwin et al. | |
| 6,756,924 B2 | 6/2004 | Lee et al. | |
| 7,295,820 B2 * | 11/2007 | Shafeeu | 455/136 |
| 2003/0202618 A1 | 10/2003 | Jensen et al. | |
| 2004/0077326 A1 | 4/2004 | Shi | |
| 2006/0205351 A1 * | 9/2006 | Fukuda | 455/63.1 |

* cited by examiner

*Primary Examiner*—Sonny Trinh
(74) *Attorney, Agent, or Firm*—Blakely Sokoloff Taylor & Zafman LLP

(57) ABSTRACT

In many circuits, including those operating in radio frequency (RF), there is commonly a need to perform DC offset cancellation. The DC offset is an error in an output signal in respect to the input that may cause a circuit to enter into undesirable or non-tolerable conditions of operation. While in most cases a static solution is provided the use of an analog loop may be inappropriate because of the adverse impact on speed. By adding a fast feedback loop finely impacting the adjustment of an amplifier, both the initial calibration is achieved as well as a recalibration of the system.

20 Claims, 3 Drawing Sheets

WIRELESS TRANSMITTER DC OFFSET RECALIBRATION

CROSS-REFERENCE TO RELATED APPLICATION

This application claims the benefit of U.S. Provisional Patent Application No. 60/625,978 filed Nov. 9, 2004.

BACKGROUND OF THE INVENTION

1. Field of the Invention

The present invention relates generally to DC offset cancellation in a circuit, and more particularly to the recalibration of DC offset cancellation in radio frequency circuits.

2. Prior Art

Many electronic systems suffer from a problem known as direct current (DC) offset. Specifically, this means that there is an error value between an input signal and an output signal in a circuit that is generally constant, and not dependent on the frequency at which the circuit happens to operate. This offset may require cancellation, as it impacts the precision of operation of a circuit as the circuit moves out of its optimal design operating point. In some cases it can also lead to improper functioning of the circuit.

Known in the art are two types of DC offset cancellation: static DC offset cancellation, and dynamic DC offset cancellation. An exemplary static DC offset cancellation circuit 100 is shown in FIG. 1. An amplifier 110 receives an input and provides an output that is sampled by digital offset calibration circuit 120. The measurement of the DC offset takes place when the system is initialized, and the measured offset is digitized and loaded into register 130. The value in register 130 is then used to calibrate amplifier 110, typically through some form of digital to analog converter associated with the analog amplifier 110, so that the DC offset cancellation is achieved. While in most cases this value remains unchanged over time if variations in time and temperature are negligible, it is possible to periodically cause the circuit to calibrate by repeating the calibration process. While a digital implementation is shown, it is also possible to have analog implementations to achieve the same result. The disadvantage of this circuit, analog or digital, is that it does not adjust over time, or otherwise requires the diversion from an operating mode to a calibration mode.

In a dynamic DC offset cancellation, there is provided a negative feedback loop where a correction value is constantly fed to the circuit. In most cases the feedback loop is analog, and an adequate size capacitor or another memory type element is used in the feedback loop for stability purposes. A person skilled-in-the-art would note that in this case, stability is traded for response time, making this type of a circuit too slow for some radio frequency (RF) applications. This kind of implementation may further lead to a constant current consumption, which must be tolerated as part of this type of solution. This is particularly disadvantageous in battery powered devices.

Therefore, due to the limitations present in prior art solutions, there is a need for DC offset cancellation circuits that will be sufficiently fast so as to operate in an RF application. It would be further advantageous if such a solution would provide for a constant fine-tuning, or recalibration, to address changes in DC offset of the circuit.

DETAILED DESCRIPTION OF THE PREFERRED EMBODIMENTS

In accordance with the disclosed invention, an initial phase of traditional direct current (DC) offset calibration is employed, which generally provides a static DC offset cancellation, as shown in prior art solutions. By way of example, the DC offset of the amplifier 110 may be measured with a zero input to the amplifier 110, or at least with a zero DC input to the amplifier, and digitized by the digital DC offset calibration circuit 120. The initial digitized correction value is stored in a register. However in accordance with the present invention, the register is enhanced to further perform as an up/down counter from the initial correction value stored in the register. The decision of counting up or down is made by a comparator operable to compare the output value to a ground, or '0' value. The up/down counter is further connected to a clock. Depending on the output of the comparator, the counter when clocked may count up or down, thereby adjusting the initial correction value stored in the register to a value that adjusts for the changes in the circuit and thereby ensures recalibration of the system to ensure DC offset cancellation over time. The details of the operation of the improved circuit are discussed in greater detail below.

Figure 1:
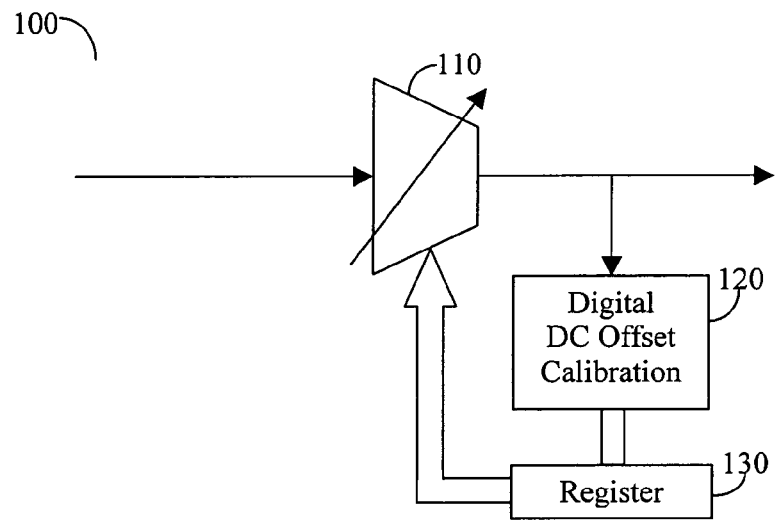
FIG. 1 is a block diagram of a prior art DC offset cancellation circuit.
Figure 2:
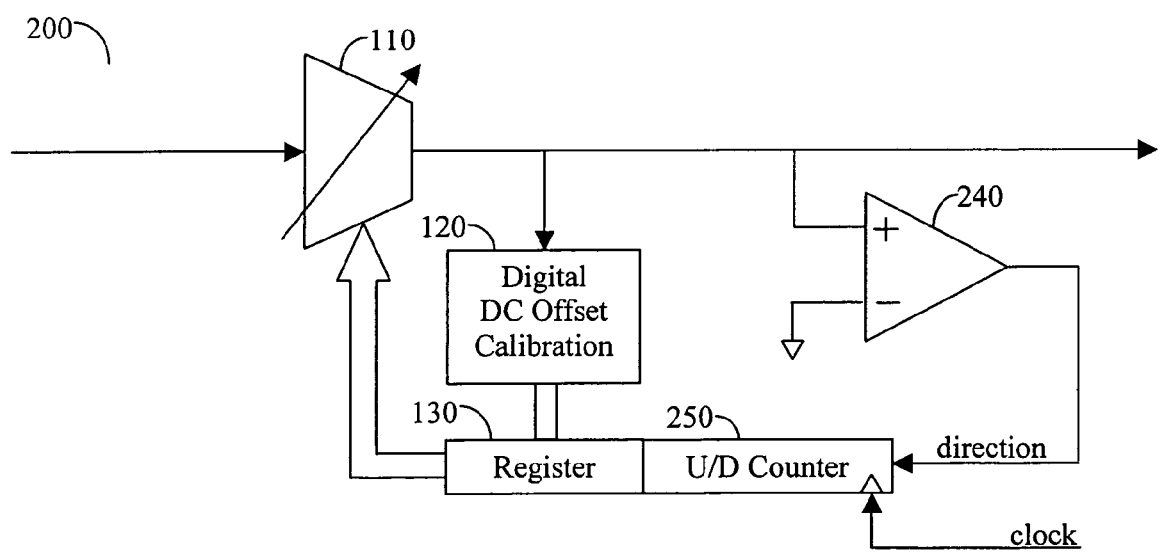
FIG. 2 is a DC offset cancellation circuit with recalibration in accordance with one embodiment of the present invention.

Reference is now made to FIG. 2 where an exemplary and non-limiting DC offset cancellation circuit 200 with recalibration in accordance with the present invention is shown. The DC offset of amplifier 110 is controllable by supplying a correction value. Initially, the circuit employs a digital DC offset calibration circuit 120 to establish an initial value that is used for the DC offset calibration as described above. In that regard, the initial value may be determined in various ways, typically in accordance with the prior art, though a digital technique such as the exemplary digital technique hereinbefore described is preferred because of the provision of a register by that technique that may be used as part of the present invention also.

In one embodiment of the disclosed invention, comparator 240 is used for at least the partial purpose of establishing the initial value. This can be done by allowing the combination of the register 130 and up/down counter 250 to work in response to the output of comparator 240. By way of example, a reasonably high frequency could be momentarily applied to the counter 250 to cause the counter to rather rapidly count up or down to the value driving the DC offset to within one count of zero, after which the counter would oscillate one count up and down as the DC offset oscillates the equivalent of a fraction of a count above and below zero. As another example, a voltage controlled oscillator driven by the DC offset could be used to control the counter 250, perhaps with a minimum frequency above zero in accordance with aspects of the present invention to be described. In any event, use of the comparator 240 and/or counter 250, in establishing the initial DC offset correction, would save on both power consumption and chip area consumed. However, in preferred embodiments, once the initial DC offset valve is determined, the value is stored in register 130, the register constantly supplying this value to amplifier 110, both during and after establishing the initial DC offset correction. The DC offset correction may correct the DC offset of the amplifier 110 using any of various techniques well known in the prior art, such as by way of example, varying some characteristic of the input stage of a multistage amplifier, or varying the input to the input stage, either of which makes the DC offset correction at the lowest power level. For purposes of this disclosure and the claims to follow, these and other techniques for DC offset correction responsive to a DC offset correction signal are to be considered the feedback of the DC offset correction signal to the amplifier itself.

Circuit 120 may comprise a successive approximation register (SAR) that applies a negative correction quantity to cancel the DC offset at the output. When the residual DC offset falls within an acceptable limit, typically the dynamic resolution of the comparator, the loop terminates and the final correction value is stored in register 130. The stability of the loop is achieved by appropriate selection of parameters of operation. However, due to the one-time nature of its operation, time tradeoffs are of no material concern.

In certain applications, for example high-end wireless applications, it is necessary to ensure that after a period of hibernation of the system, typically performed to save on power consumption, that the DC offset remains at acceptable levels. Therefore, in accordance with one embodiment of the disclosed invention, at the end of a normal operating cycle, for example, as the last task performed prior to the entering of a hibernation (or sleep) mode, comparator 240 is turned on for the purpose of determination of the sign of the residual offset. When the offset is positive, then the counter 250 counts down '1', and '1' is subtracted from the current correction value of register 130. Otherwise, '1' is added to the correction value in register 130. The up or down operation is achieved by means of up/down counter 250, where the direction of the count is controlled by the output of comparator 240. Therefore, as a result of this operation, the count tracks the DC offset drift, though without drift, there is achieved a deliberate small oscillation around the desired DC offset value. This ensures that any drifts, for example due to time or temperature, are going to be corrected before the system, for example system 200, comes out of its hibernation mode. The process ensures a fine-tuning of the residual DC offset with the DC offset oscillating around '0' plus or minus no more than the equivalent of one digit or one count.

Figure 3:
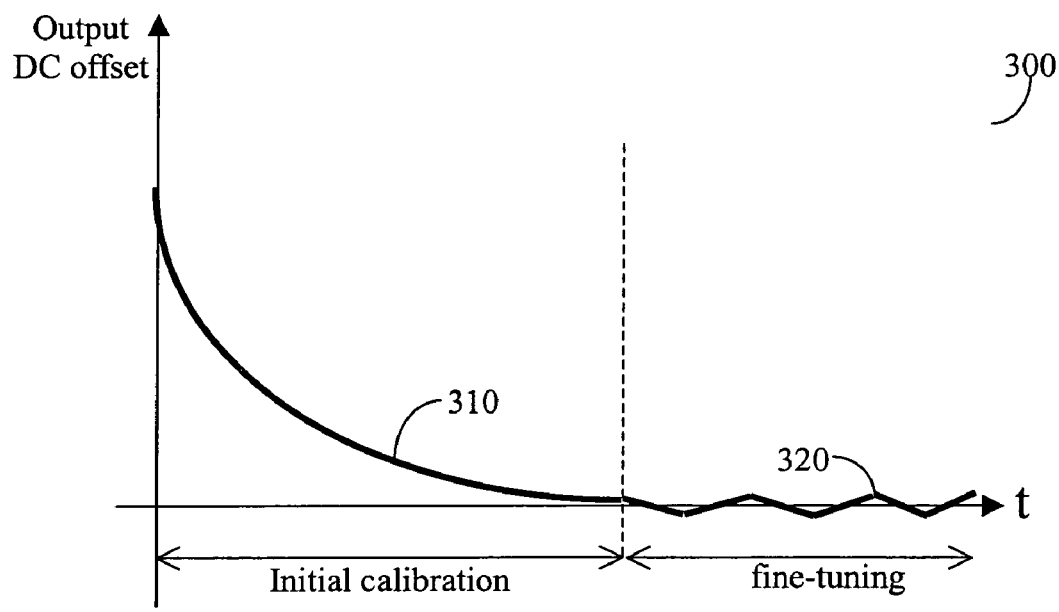
FIG. 3 is a waveform describing the recalibration of DC offset cancellation.

Reference is now made to FIG. 3 where a typical waveform 300 describing the recalibration of DC offset cancellation is shown. In the initial calibration phase, the waveform 310 quickly approaches the cancellation value of the DC offset. In that regard, the shape of the initial calibration curve 310 is schematic only, as the actual shape will depend on the specific method of initial calibration chosen to be used, the shape shown being representative of initial calibration systems wherein the rate of DC offset correction is proportional to the then existing DC offset error itself. As previously mentioned, in a preferred embodiment, during the dynamic fine tuning just prior to entering hibernation, a single fine tuning, or recalibration, takes place in response to a single clock pulse, ensuring that the system, for example system 200, remains within an effective DC offset cancellation as described above. If there is no long-term drift in the DC offset, the count of the counter 250 and the register 130 contents will alternate on successive hibernations between two adjacent counts, so that the cumulative up counts and cumulative down counts will be equal (within one count). If there is a long-term drift in the DC offset, the count of the counter 250 and the register 130 contents will sometimes, but not always alternate between two adjacent counts, so that the cumulative up counts and cumulative down counts will be unequal, the count and register contents drifting up or down with the drift in the DC offset, thereby correcting the DC offset within one count as it drifts.

In another embodiment of the disclosed invention, during the dynamic fine-tuning, just prior to entering hibernation, a limited fine-tuning, or recalibration, step takes place, ensuring that the system, for example system 200, remains with an effective DC offset cancellation, while achieving the recalibration goal in a fast manner and without affecting the performance of system 200. This fine-tuning (incrementing and decrementing) may be limited in various ways, such as by way of example, by clocking the up/down counter 250 a fixed number of times, or by directly or indirectly sensing one or more changes in state of the output of comparator 240, indicating the beginning of oscillation of the count of counter 250 around the desired DC offset compensation count.

Figure 4:
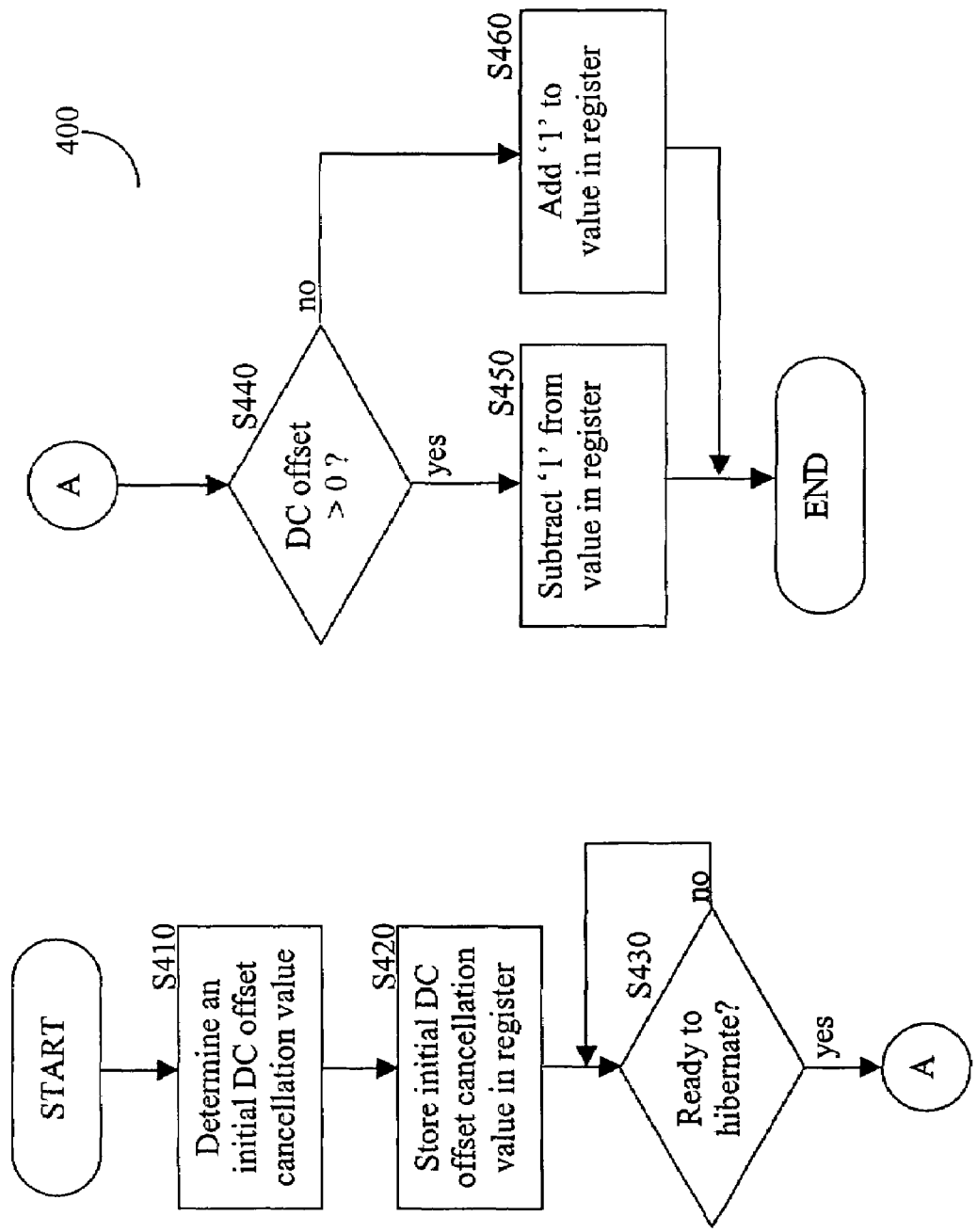
FIG. 4 is an exemplary flowchart of DC offset recalibration in accordance with an embodiment of the disclosed invention.

Reference is now made to FIG. 4 where an exemplary and non-limiting flowchart 400 of DC offset recalibration in accordance with the single fine tuning embodiment of the disclosed invention is shown. In block 410, a determination of an initial calibration value, for example to amplifier 110, is made to ensure DC offset cancellation. In block 420 the cancellation value, determined in block 410, is stored in a register, for example register 130, and thereafter is used for DC offset cancellation when the system is not in hibernation. In block 430 it is checked whether the system is ready to go into a hibernation mode, and if so, execution continues with block 440. Otherwise execution remains in block 430 until such time that the answer to the test is affirmative. In block 440 it is checked whether the DC offset has a positive value, and if so, execution continues with block 450. Otherwise, execution continues with block 460. In block 450 the value in the register, for example register 130, is reduced by 1, after which system 200 enters hibernation. In block 460 the value in the register, for example register 130, is increased by 1, after which system 200 enters hibernation.

Figure 5:
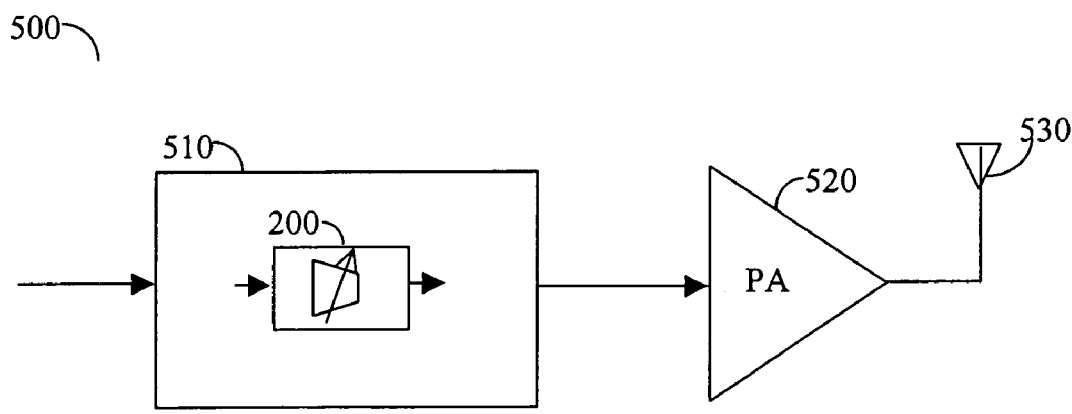
FIG. 5 is a block diagram of a wireless transmitter comprising the recalibration of DC offset cancellation circuit of the disclosed invention

With reference to FIG. 5, there is shown an exemplary and non-limiting schematic block diagram of a wireless transmitter 500. Wireless transmitter 500 comprises a transmitter circuit 510, a power amplifier 520, receiving a signal to be transmitted from transmitter circuit 510, and an antenna 530 coupled to the output of the power amplifier 520. Transmitter circuit 510 comprises at least an amplifier 200, the circuit of which is designed in accordance with the disclosed invention, thereby ensuring that when the wireless transmitter 500 is to enter its hibernation phase, the processes for DC offset cancellation are preformed in accordance with the disclosed invention.

The approach disclosed by this invention has the advantage over prior art solutions by employing both a static and dynamic offset cancellation, taking the advantages of both without the downsides of each. The majority of the DC offset is compensated for using a traditional approach for the initial calibration phase, while drifts such as those caused over time and temperature change, are fine-tuned in time, in a similar fashion to an analog continuous approach without the need to use purely analog circuits. Therefore, the advantages of the disclosed circuit are achieved without any power, stability or speed limitations, and with minimal size area consumption for the circuit added. When the DC offset drift correction is made when the system enters hibernation, the offset drift correction is immediately available when the system exits hibernation without any time delay.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A wireless transmitter comprising at least an amplifier configured to amplify an input signal, the amplifier connected to a circuit for the recalibration of a DC offset compensation of the amplifier comprising: circuitry for sensing an initial DC offset correction value for the system; circuitry for storing the correction value; circuitry for recalibration of the DC offset of the system using the correction value; circuitry for comparing the present DC offset of the system to a predetermined value; and, circuitry for incrementing and decrementing the content of the circuitry for storing responsive to an output of the circuitry for comparing;

wherein the incrementing and decrementing takes place as a last task prior to the entering of hibernation of the wireless transmitter.

2. The wireless transmitter of claim 1 wherein the predetermined value is zero.

3. The wireless transmitter of claim 1 wherein the correction value is stored in digital form and incrementing and decrementing comprises increasing and reducing the stored correction value by one, respectively.

4. The wireless transmitter of claim 1 wherein a single incrementing or decrementing takes place prior to hibernation.

5. The wireless transmitter of claim 1 wherein a limited incrementing or decrementing takes place prior to hibernation.

6. The wireless transmitter of claim 1 wherein a single incrementing or decrementing takes place prior to hibernation.

7. The wireless transmitter of claim 1 wherein a limited incrementing or decrementing takes place prior to hibernation.

8. A method for the recalibration of a DC offset of a system comprising:

determining an initial DC offset cancellation value for the system;

storing the cancellation value in a register;

recalibrating the DC offset of the system using the correction value;

determining if the system is about to enter a hibernation mode and if not, waiting until the system is about to enter hibernation;

if the system is about to enter the hibernation mode, comparing the present DC offset value to a predetermined value and incrementing or decrementing the stored cancellation value responsive to the comparison.

9. The method of claim 8 wherein the system is a wireless transmitter.

10. The method of claim 8 wherein the predetermined value if zero.

11. The method of claim 8 wherein incrementing and decrementing comprises increasing and reducing the cancellation value by one, respectively.

12. The method of claim 11 wherein the incrementing or decrementing takes place only once prior to each entry into hibernation.

13. The wireless transmitter of claim 11 wherein a limited incrementing or decrementing takes place prior to hibernation.

14. A wireless transmitter capable of recalibration of DC offset, the circuit for recalibration of DC offset comprising:

means for determining an initial DC offset correction value for the transmitter;

means for storing the correction value;

means for recalibrating the DC offset of the transmitter using the correction value;

means for comparing a present DC offset of the transmitter to a predetermined value; and, means for incrementing or decrementing the stored cancellation value responsive to the comparison;

wherein the circuit for recalibration of the DC offset is further capable of receiving an indication of an intent to enter an hibernation state from the wireless transmitter.

15. The wireless transmitter of claim 14 wherein the predetermined value is zero.

16. The wireless transmitter of claim 14 wherein the incrementing and decrementing takes place as a result of the indication of the intent to enter hibernation.

17. The method of claim 14 wherein the cancellation value is a digital value and incrementing and decrementing comprises increasing and reducing the cancellation value by one, respectively.

18. The wireless transmitter of claim 17 wherein the incrementing and decrementing takes place as a last task prior to the entering of hibernation of the wireless transmitter.

19. The wireless transmitter of claim 18 wherein a single incrementing or decrementing takes place prior to hibernation.

20. The wireless transmitter of claim 18 wherein a limited incrementing or decrementing takes place prior to hibernation.

* * * * *